3,758,451
MAGNESIUM RESINATE OF DISPROPORTIONATED ROSIN
Henry P. Weymann, Pensacola, Fla., assignor to
Tenneco Chemicals Inc.
No Drawing. Filed June 14, 1971, Ser. No. 153,110
Int. Cl. C09f 1/00
U.S. Cl. 260—105  4 Claims

ABSTRACT OF THE DISCLOSURE

Disproportionated rosin having a Ball and Ring Softening Point below 60° C. is reacted with from 3 percent to 8 percent of its weight of a reactive magnesium compound in the presence of an acidic catalyst and a hydrocarbon solvent. The resulting magnesium resinates have high softening points and are compatible with a wide variety of elastomers.

---

This invention relates to magnesium resinates of disproportionated rosin and to a process for their production. More particularly, it relates to the production of magnesium resinates of soft disproportionated rosin that contain about 3 percent to 8 percent by weight of combined magnesium.

In the past, attempts to prepare magnesium salts of rosin that contain at least 3 percent by weight of combined magnesium for use in the production of adhesive compositions have been unsuccessful because the reaction of rosin with 3 percent or more of magnesium oxide or another reactive magnesium compound invariably results in the formation of insoluble, infusible products that cannot be used as ingredients of adhesive compositions.

In accordance with this invention, it has been found that magnesium resinates that are compatible with a broad range of elastomers and that are soluble in aliphatic and aromatic solvents result when soft disproportionated rosin is reacted with from 3 percent to 8 percent or more of its weight of a reactive magnesium compound in the presence of an acidic catalyst and a hydrocarbon solvent.

Because of their high softening points and their high degree of compatibility with elastomers, these magnesium salts of disproportionated rosin are useful as ingredients of adhesive compositions. For example, they can be used to increase the strength of elastomer-based adhesives or to raise the softening temperature of hot melt adhesives.

The magnesium resinates of this invention are prepared by the reaction of a soft disproportionated rosin with from about 3 percent to about 8 percent of its weight of a reactive magnesium compound, such as magnesium oxide, magnesium formate, or magnesium acetate, in the presence of 0.1 percent to 1.0 percent and preferably 0.3 percent to 0.8 percent, based on the weight of disproportionated rosin, of an acidic catalyst that is a lower alkanoic acid, for example, formic acid, acetic acid, or propionic acid. The reaction is carried out in a hydrocarbon solvent that has a boiling point above about 140° C., a boiling point sufficiently high so that as the solvent is removed by distillation from the reaction mixture after completion of the reaction the product will remain in a molten state as the reaction mixture becomes more and more concentrated. The preferred solvents are mineral spirits and xylene. The reaction is carried out at a concentration of about 25 percent to about 80 percent by weight of solids in the hydrocarbon solvent. Higher concentrations are not used because of viscosity limitations. Particularly satisfactory results have been obtained when the reaction mixture contained 70 percent to 80 percent by weight of solids.

The temperature at which the magnesium resinate is formed is usually between 40° C. and 100° C. The reaction between disproportionated rosin and the reactive magnesium compound is exothermic and cooling of the reaction mixture may be necessary if the reaction temperature is to be kept within the indicated range.

When the reaction has been completed, the reaction mixture is heated to a temperature between about 150° C. and 260° C. to remove the solvent. It is then sparged with superheated steam to remove the last traces of solvent and volatile reaction by-products from the product.

The magnesium resinates prepared by the process of this invention are clear bright resins that are soluble in a wide variety of aliphatic and aromatic solvents and that have a high degree of compatibility with elastomers.

The disproportionated rosin from which the magnesium resinates are formed may be prepared by known procedures from wood rosin, gum rosin, or tall oil rosin. For example, rosin can be disproportionated by heating it at a temperature between 50° C. and 300° C. in the presence of a catalyst, such as palladium, platinum, nickel, iodine, sulfur, or sulfur dioxide. A preferred method for the disproportionation of rosin, which yields a soft, tacky product, is described by Kajanne and Honkanen in their paper "Studies on Tall Oil Rosin," Parts I and II, Papieri ja Puu 39, No. 4a, 171–177. and No. 8, 377–382 (1957), (Finnish Paper Journal in English). In this process rosin is heated at 250° C. in the presence of 0.1 percent to 0.5 percent of iodine for from 0 to 10 hours. Soft disproportionated rosin prepared in this way has a Ball and Ring Softening Point (ASTM Test Procedure D-28) between about 35° C. and 60° C. and an acid number between 145 and 180.

The invention is further illustrated by the following examples.

EXAMPLE 1

A mixture of 100 parts by weight of disproportionated rosin having an acid number of 165 and a Ball and Ring Softening Point of 56° C., 8 parts by weight of magnesium oxide, 0.5 part by weight of acetic acid, and 70 parts by weight of mineral spirits was heated to 50° C. The reaction that then took place was vigorously exothermic. When the reaction was complete, the reaction mixture was heated to 260° C. to remove the mineral spirits; then it was sparged with steam at that temperature to remove traces of mineral spirits and of volatile reaction by-products.

The molten product was clear amber in color, contained no precipitated material, and although viscous could be poured after it had cooled to 200–220° C. The product had a Ball and Ring Softening Point of 168° C. It was soluble in toluene, mineral spirits, and methyl ethyl ketone and compatible with natural rubber, styrene-butadiene copolymers, ethylene-vinyl acetate copolymers containing 18 percent to 40 percent of vinyl acetate, chlorinated polyethylene, polychloroprene, and butadiene-acrylonitrile copolymers.

EXAMPLES 2–4

Using the procedure described in Example 1, a series of magnesium resinates of disproportionated rosin was prepared. The reactants used and the properties of the products are set forth in the following table. Each of the products obtained in Examples 2, 3 and 4 was a clear, bright resin that was soluble in mineral spirits, methyl ethyl ketone, xylene, and toluene and compatible with natural rubber, styrene-butadiene copolymers, ethylene-vinyl acetate copolymers, polyethylene, polychloroprene, butadiene-acrylonitrile copolymers, and other polymeric materials.

| Example | 2 | 3 | 4 |
|---|---|---|---|
| Disproportionated rosin: | | | |
|   B and R softening point, °C | 56 | 56 | 58 |
|   Acid number | 165 | 165 | 170 |
|   Amount used (parts by weight) | 100 | 100 | 100 |
| Magnesium oxide (parts by weight) | 4 | 6 | 8 |
| Acetic acid (parts by weight) | 0.4 | 0.5 | 0.8 |
| Mineral spirits (parts by weight) | 25 | 25 | 25 |
| Properties of magnesium resinate: B and R softening point, °C | 82 | 175 | 192 |

The terms and expressions which have been employed are used as terms of description and not of limitation. There is no intention in the use of such terms and expressions of excluding any equivalents of the features shown and described or portions thereof, but it is recognized that various modifications are possible within the scope of the invention claimed.

What is claimed is:

1. The process for the production of magnesium resinates of disproportionated rosin that consists of the steps of
   (a) Forming a mixture of 100 parts by weight of disproportionated rosin having an ASTM Ball and Ring Softening Point between 35° C. and 60° C. and an acid number between 145 and 180, 3 parts to 8 parts by weight of a reactive magnesium compound, 0.1 part to 1 part by weight of a lower alkanoic acid, and 20 parts to 75 parts by weight of a solvent for said disproportionated rosin, said solvent having a boiling point above 140° C.;
   (b) Heating said mixture at a temperature in the range of about 40° C. to 100° C. to form a solution of the magnesium resinate of disproportionated rosin in said solvent; and
   (c) Recovering said magnesium resinate.

2. The process as defined in claim 1 wherein the reactive magnesium compound that is reacted with disproportionated rosin is magnesium oxide.

3. The process as defined in claim 1 wherein the reaction mixture contains 0.3 part to 0.8 part by weight of acetic acid per 100 parts by weight of disproportionated rosin.

4. A magnesium resinate of disproportionated rosin that is the product of the process of claim 1.

References Cited
UNITED STATES PATENTS

| 2,572,071 | 10/1951 | St. Clair | 260—105 |
| 2,562,020 | 7/1951 | Darlington | 260—105 |

DONALD E. CZAJA, Primary Examiner

W. E. PARKER, Assistant Examiner

U.S. Cl. X.R.

260—27, 33.6